United States Patent Office 3,063,940
Patented Nov. 13, 1962

3,063,940
FIRE EXTINGUISHING COMPOSITION
Eric Edward Cooper Cawood, Elland, England, assignor to Nu-Swift Limited, Elland, England
No Drawing. Filed Apr. 7, 1960, Ser. No. 20,535
Claims priority, application Great Britain Apr. 10, 1959
6 Claims. (Cl. 252—2)

This invention relates to the preparation of dry fire-extinguishing powders which are intended for use on all classes of fires, such as ember fires in carbonaceous materials, surface fires, gas fires, fires of combustible liquids and fires in electrical equipment.

Dry fire-extinguishing powders are known which may be used on surface fires, combustible liquid and gas fires and fires in electrical equipment. These powders, however, are not effective on ember fires in carbonaceous materials and consist mainly of sodium bicarbonate treated to prevent caking. Furthermore, a powder has been proposed which was suitable for extinguishing ember fires, but it suffers from the disadvantage that it does not maintain a free flowing condition after prolonged storage, because it gradually absorbs moisture from the air and cakes after standing for several months.

In the specification of our British patent application No. 783,656 there is described a dry fire-extinguishing powder for use on all classes of fires, and the present invention is designed to provide an alternative composition which is particularly suitable for use in constant pressure type fire-extinguishers, in which both the powder and the expellent gas under pressure are stored admixed in the same container and are discharged simultaneously.

According to the invention, a dry fire-extinguishing compound comprises a mixture of ammonium sulphate, ammonium di-hydrogen phosphate (mono ammonium phosphate) and potassium chloride with the addition of a small quantity of other substances which maintain the mixture in a free flowing condition. Any of the usual substances for this purpose may be used for example talc, tricalcium phosphate and water insoluble metal stearate, that is, any one or more of these substances or equivalent substances may be incorporated in the mixture.

Ammonium di-hydrogen phosphate is used instead of the diammonium phosphate of some other fire-extinguishing powders, because ammonium di-hydrogen phosphate is particularly suitable for pressurised storage. However, a larger proportion of ammonium di-hydrogen phosphate is required than would be the case if diammonium phosphate was used, because of the lower ammonium content of ammonium di-hydrogen phosphate. A high ammonium content is desirable, so that the powder will evolve ammonia gas when applied to a fire, the ammonia gas being a useful flame extinguisher.

The potassium chloride is used instead of the sodium bicarbonate of other fire-extinguishing powders on account of the better storage stability and higher fire extinguishing efficiency of potassium salts.

A preferred composition is as follows:

Example

| | Parts |
|---|---|
| Ammonium sulphate, $(NH_4)_2SO_4$ | 40 |
| Ammonium di-hydrogen phosphate, $NH_4H_2PO_4$ | 40 |
| Potassium chloride (KCl) | 10 |
| Talc | 10 |
| Tricalcium phosphate | 2 |
| Water insoluble metal stearate | 1 |

The above proportions are by weight and the proportions of ammonium sulphate and ammonium di-hydrogen phosphate may be plus or minus 10%. Potassium chloride may be between 10 and 15 parts and all the first three substances should be finely divided so as to pass a 100 mesh screen (i.e. a screen having 100 meshes per inch). The talc, tricalcium phosphate and water insoluble metal stearate should be more finely divided so as to pass a 300 mesh screen (i.e. a screen having 100 meshes per inch). Furthermore, the proportions of the talc, tricalcium phosphate and water insoluble metal stearate may be varied, for example talc may be from 10 to 15 parts, and any or all of these three substances may be replaced by equivalent substances which will maintain the mixture in a free flowing condition.

What we claim is:
1. A dry fire extinguishing composition consisting essentially of a mixture by weight of 36 to 44 parts ammonium sulphate, 36 to 44 parts ammonium di-hydrogen phosphate, 10 to 15 parts potassium chloride and up to 18 parts of other substances which maintain the mixture in a free flowing condition.
2. A dry fire extinguishing composition as defined in claim 1 which includes talc.
3. A dry fire extinguishing composition as defined in claim 1 which includes up to 2% by weight of tricalcium phosphate.
4. A dry fire extinguishing composition as defined in claim 1 which includes up to 1% by weight of a water insoluble metal stearate.
5. A dry fire extinguishing composition as defined in claim 1 in which the ammonium sulphate, ammonium di-hydrogen phosphate and potassium chloride are all finely divided so as to pass through a 100 mesh screen.
6. A dry fire-extinguishing composition as defined in claim 5, in which the substances other than ammonium sulphate, ammonium di-hydrogen phosphate and potassium chloride are finely divided to pass through a 300 mesh screen.

References Cited in the file of this patent

UNITED STATES PATENTS

| 327,929 | Eddison | Oct. 6, 1885 |
| 1,276,742 | Ferguson | Aug. 27, 1918 |
| 2,816,864 | Warnock | Dec. 17, 1957 |
| 2,881,138 | Reiss | Apr. 7, 1959 |
| 2,901,427 | Steppe | Aug. 25, 1959 |
| 2,901,428 | Schulenburg | Aug. 25, 1959 |

FOREIGN PATENTS

| 745,362 | Great Britain | Feb. 22, 1956 |
| 783,656 | Great Britain | Sept. 25, 1957 |
| 806,642 | Great Britain | Dec. 31, 1958 |